United States Patent [19]

Hense

[11] Patent Number: 5,042,424

[45] Date of Patent: Aug. 27, 1991

[54] FISH CRIB

[76] Inventor: Brian J. Hense, S88 W23195 Wynn Dr., Big Bend, Wis. 53103

[21] Appl. No.: 546,006

[22] Filed: Jun. 28, 1990

[51] Int. Cl.⁵ ............................................. A01K 61/00
[52] U.S. Cl. .............................................. 119/3; 119/4
[58] Field of Search ..................................... 119/2, 3, 4

[56] References Cited

U.S. PATENT DOCUMENTS

| 831,200 | 9/1906 | Willis | 119/4 |
|---|---|---|---|
| 3,561,402 | 2/1971 | Ishida et al. | 119/3 |
| 3,601,095 | 8/1971 | Olsson | 119/2 |
| 3,691,994 | 9/1972 | McPherson | 119/3 |
| 3,695,229 | 10/1972 | Renn | 119/4 |
| 3,741,159 | 6/1973 | Halaunbrenner | 119/2 |
| 4,165,711 | 8/1979 | Aoki | 119/3 |

OTHER PUBLICATIONS

"Spring Walleye Hot-Spots", Joe Bucher, Fishing Facts Magazine, May, 1990 Issue, pp. 8-13.

Primary Examiner—Paul J. Hirsch
Attorney, Agent, or Firm—Andrus, Sceales, Starke & Sawall

[57] ABSTRACT

A fish crib generally comprises a series of side panels extending between top and bottom panels. The side panels are provided with openings providing access to the closed structure formed by assembly of the top, bottom and side panels. Individual connector members extend through apertures located adjacent the edges of the panels for securing them together. Brace members are positioned in the interior of the closed structure for providing lateral stability. The assembled fish crib is adapted to be sunk into a body of water so that the bottom panel is in place on the bottom of the body of water, and brush is adapted for placement into the interior of the structure to enhance its desirability as a fish habitat.

18 Claims, 2 Drawing Sheets

U.S. Patent    Aug. 27, 1991    Sheet 1 of 2    5,042,424
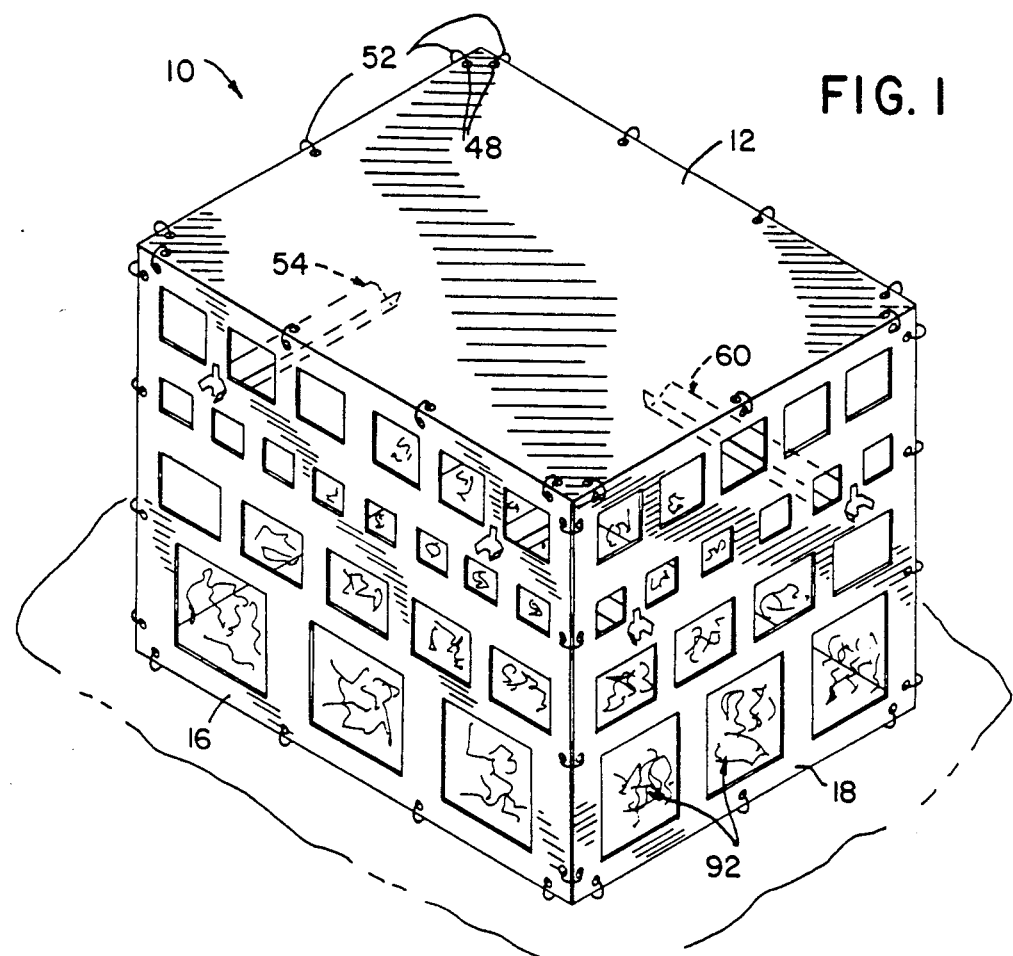
FIG. 1
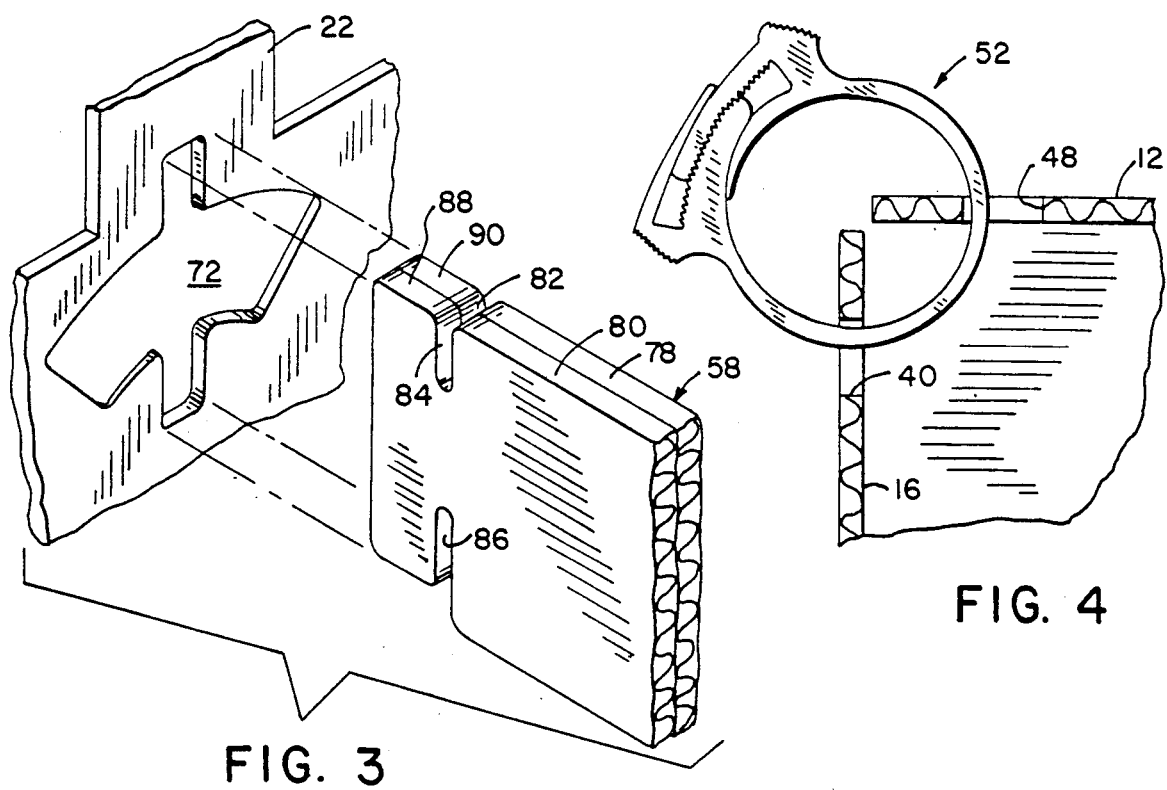
FIG. 3
FIG. 4

FISH CRIB

BACKGROUND AND SUMMARY

This invention relates to a device known as a fish crib, which is adapted for use in an underwater environment to provide a fish habitat, and more particularly to an improved fish crib structure.

In the past, it has been known to construct a fish crib by lashing logs together to form a structure in which leaves, twigs, or other brush is placed. The filled structure is then towed to a desired location in a body of water such as a lake, and is sunk to the bottom of the water body. Another effective fish crib placement method involves moving the crib to a desired location during the last winter months while the lake is frozen. When the ice melts, the crib sinks to the bottom of the lake. The fish crib is a desirable habitat for fish, providing cover in a location which would otherwise be an unsatisfactory environment for fish.

Fish cribs of this type are often placed by fishermen who mark its location and return during warm weather months to fish in the vicinity of the fish crib.

A fish crib as described above presents several problems. For one, governmental agencies often wish to regulate the placement of fish cribs to ensure that they are in a proper location providing adequate water depth and are not positioned too close to another crib. In addition, if the fish crib is placed in a shallow location, lowering of the water level may result in damage to the lower unit of boat motors which strike the logs of the fish crib.

The present invention has as its object to provide a fish crib structure functionally superior to the type described above, and which is readily adapted to be distributed by a governmental agency to those who wish to place a fish crib into a body of water. The functional superiority of the fish crib is an incentive to obtain a fish crib from a proper authority before placement, allowing the authority to keep track of the location of the fish crib in the water body. It is a further object of the invention to provide a fish crib which is capable of being transported in a knock-down fashion, and thereafter assembled in a desired location and which is easily movable after assembly either on ice, in a boat, or towed behind a boat. It is a further object of the invention to provide a fish crib which is constructed of a material which is stable and will not break down in an underwater environment, but yet which will not cause damage to marine equipment in the event the water level in the body of water is lowered an amount sufficient to create potential for marine equipment to strike the fish crib.

In accordance with the invention, a fish crib comprises a bottom panel adapted for placement onto the bottom of a body of water, and a series of side panels extending upwardly from the bottom panel. Connector means is provided for securing the lower portion of the side panels to the bottom panel, and for securing the side panels along their side portions to each other, to form a substantially closed structure into which brush or the like is placed. The side panels are provided with openings which allow access to the interior of the structure. In a preferred embodiment, a top panel is spaced above the bottom panel, with the side panels extending between the top and bottom panels. The connector means is adapted to secure the upper portion of the side panels to the top panel. Internal lateral support means is preferably provided for providing lateral stability to the structure. The internal lateral support means preferably comprises a plurality of brace members extending between side panels within the interior of the structure. Each brace member is provided with engagement means formed at its ends engagable with slots formed in the side panels for interconnecting each end of the brace member with a side panel. Connecting structure is provided on the side panels for receiving and securing the ends of the brace members, to fix the lateral position of the brace members relative to the side panels.

The top, bottom and side panels are preferably formed of a material such as corrugated plastic, which is resistant to breakdown in an underwater environment.

The invention further contemplates a method of creating a fish habitat. The method comprises the steps of providing a top panel, a bottom panel and a plurality of side panels. The side panels are provided with openings. The top, bottom and side panels are assembled to form a substantially closed structure, with the openings in the side panels providing access to the interior of the structure. A quantity of brush or the like is placed into the interior of the structure, and the structure is placed into a body of water such that the bottom panel rests on the bottom of the body of water. The method further contemplates a particular arrangement for connecting the top, bottom and side panels together, and providing a brace system in the interior of the structure for increasing its lateral stability.

BRIEF DESCRIPTION OF THE DRAWINGS

The drawings illustrate the best mode contemplated of carrying out the invention.

In the drawings:

FIG. 1 is an isometric view of an assembled fish crib structure constructed according to the invention, in place within a body of water;

FIG. 3 is an enlarged isometric view showing connection of a brace member to one of the side panels of the fish crib of FIG. 1; and FIG. 4 is a partial sectional view showing a typical connector system for securing the panels together.

DESCRIPTION OF THE PREFERRED EMBODIMENT

Figure 2:
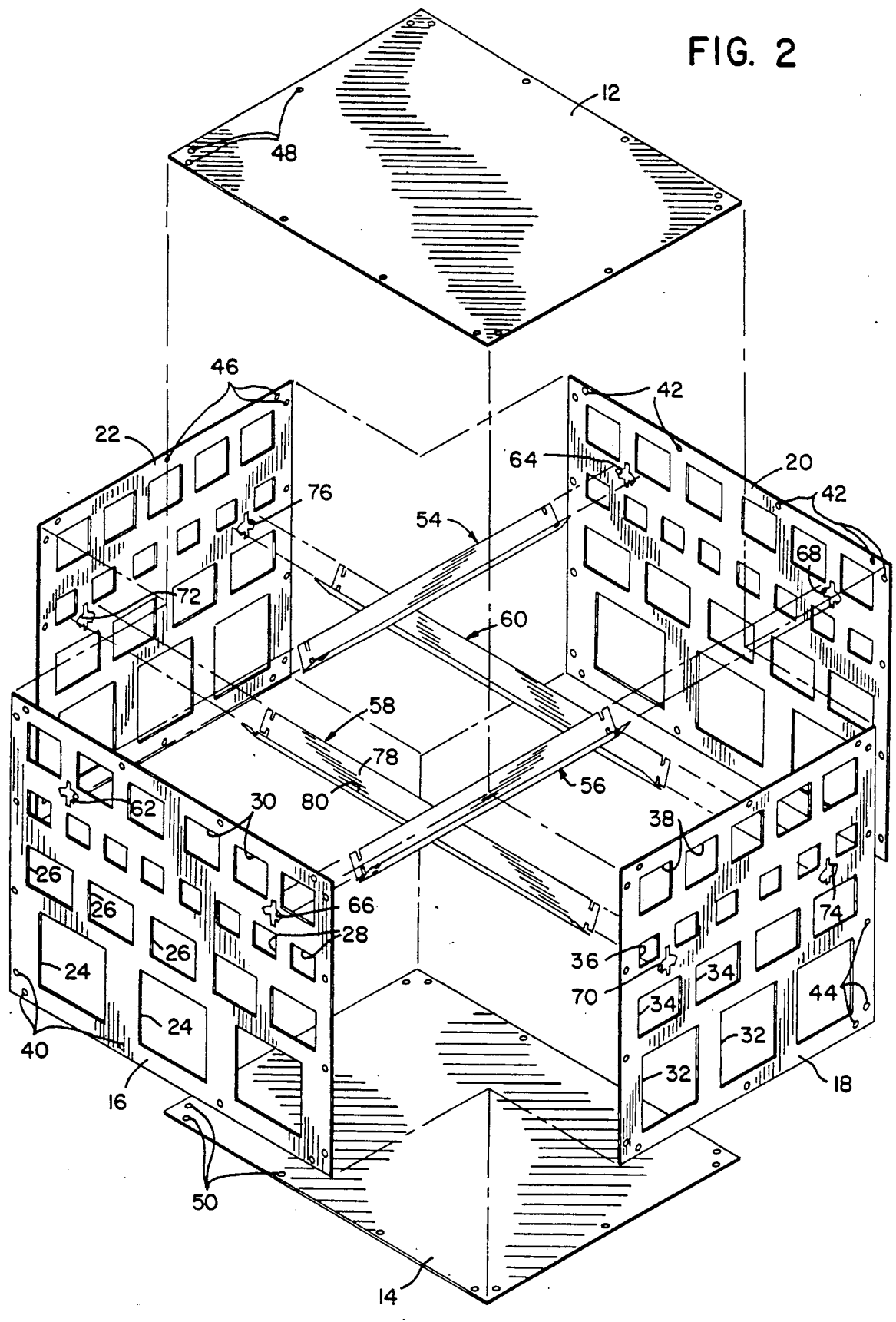
FIG. 2 is an exploded isometric view showing the components of the fish crib structure of FIG. 1.

Referring to FIGS. 1 and 2, a fish crib 10 is constructed of a top panel 12, a bottom panel 14, and a series of side panels shown at 16, 18, 20 and 22. Panels 12-22 are adapted to be fit together to form a substantially closed fish crib structure, such as shown at 10 in FIG. 1.

Panels 12-22 are constructed of a relatively lightweight, high density polyethylene corrugated plastic material such as that manufactured by the U.S. Corrulite Corporation under its designation "Corrulite". The panels are constructed of a 200 pound material, which is understood to mean a material in which 200 pounds of resin is used to make 1000 square feet of material.

Side panels 16-22 are provided with a series of rectangular or square openings. Referring to side panel 16, its lower area is provided with three relatively large lower openings shown at 24. Five rectangular openings 26 are located above lower openings 24, and a series of eight relatively small square openings 28 are located above openings 26. Six square openings 30 are located in the upper portion of side panel 16. Side panel 20 is constructed identically to side panel 16, providing openings 24, 26, 28 and 30.

Side panel 18 is provided with three lower openings 32 and four openings 34 located above openings 2. Six small square openings 36 are located above openings 34, and five upper square openings 38 are located above openings 36 in the upper portion of side panel 18. Side panel 22 is constructed identically to side panel 18.

The side panel openings provide approximately 40% to 50% of open area to each side panel.

When panels 12-22 are assembled as shown in FIG. 1, access to the interior of fish crib 10 is provided by openings 24-38 formed in side panels 16, 18, 20, and 22.

Referring again to panel 16, a series of apertures 40 are provided about its periphery adjacent its edges. Side panel 20 is provided with a series of apertures 42 located similarly to apertures 40 on side panel 16.

Side panel 18 is also provided with a series of spaced apertures, shown at 44, about its periphery and adjacent its edges. Side panel 22 is provided with apertures 46 in locations identical to the locations of apertures 44 in side panel 18.

Top panel 12 is provided with a series of apertures 48 adjacent its edges about its periphery, and bottom panel 14 is provided with apertures 50 located similarly to apertures 48 on top panel 12. Apart from apertures 48, 50 on top and bottom panels 12, 14 respectively, top and bottom panels 12, 14 are free from openings therethrough.

When top panel 12, bottom panel 14, and side panels 16-22 are assembled to form a closed structure such as shown in FIG. 1, the apertures in the respective top, bottom and side panels are located so as to provide closely adjacent pairs of apertures at the corners of the closed structure. Plastic connector members 52 are adapted to extend through the pairs of apertures for connecting the top, bottom and side panels together.

With reference to FIG. 4, a typical joint at a corner of fish crib 10 is illustrated. As illustrated, opening 48 in top panel 12 and opening 40 in side panel 16 cooperate to form a pair of closely adjacent openings. Connector member 52 in its opened position is inserted through openings 48 and 40, and is then moved to its closed position as illustrated in FIG. 4 to secure top panel 12 to side panel 16.

Connector members 52 may be any satisfactory connector for securing panels together. In the illustrated embodiment, connector members 52 are hose clamps such as manufactured and marketed by the Tyton Corporation of Milwaukee, Wis. under its designation "Snapper", advertised as made in accordance with U.S. Pat. No. 3,605,200. While this type of connector works well to assemble fish crib 10 as illustrated, it is understood that any other satisfactory connector could be utilized.

Either before or after panels 12-22 are secured together with connectors 52, brace members shown at 54, 56, 58 and 60 are positioned between side panels 16, 20 and 18, 22 and interconnected therewith. Brace members 54-60 act to provide lateral stability to fish crib 10 after assembly.

Referring to FIG. 2, side panels 16 and 18 are provided with slots 62, 64, respectively, for receiving the ends of brace member 54, and are also provided with slots 66, 68, respectively, for receiving the ends of brace member 56. Side panels 18, 22 are provided with slots 70, 72 and 74, 76, respectively for receiving the ends of brace members 58, 60.

Brace members 54-60 are each constructed of a relatively heavyweight corrugated plastic material, such as sold by the U.S. Corrulite Corporation under its designation "Corrulite". A 500 pound material is employed to form brace members 54-60.

Brace member 54-60 are formed to provide a substantially V-shape in cross section. Referring to brace member 58, a pair of diverging leg portions 78, 80 form its V-shaped cross section. Brace member 58 is formed from a single piece of corrugated plastic material which is cut along its length partially through the thickness of the piece of material. The partial cut extends through one web of the material and through the corrugation, leaving the other web intact. With this arrangement, a longitudinal hinge is formed by the intact web in the center of the piece of material, allowing leg portions 78 and 80 to be bent about the hinge portion to form the V-shaped cross section to brace member 58.

Referring to FIG. 3, the end of brace member 58 is illustrated along with slot 72 formed in side panel 22. Brace member 58 is shown folded about its longitudinal hinge to an assembly position in which its leg portions 78 and 80 face and abut each other. Each of leg portions 78 and 80 is provided toward its end with a slot, shown at 82, 84, respectively. A pair of opposed slots, one of which is shown at 86, are formed in the lower area of leg portions 78, 80 below slots 82, 84. The slots in the leg portions, such as 84, 86 in leg portion 80, cooperate to define outer tab members 88, 90 in the leg portions of brace member 58.

When brace member 58 is in its assembly position as shown in FIG. 3, tabs 88 and 90 are inserted through upper and lower vertical extension portions formed in slot 72 which are adapted to receive tabs 88 and 90. After tabs 88 and 90 are moved through the vertical extension portions of slot 72, and the slots forming tabs 88, 90 are aligned with the plane of side panel 22, leg portions 78, 80 of brace member 58 are moved away from each other so that the material of side panel 22 adjacent slot 72 is received within the slots of brace member 52, such as 82, 84 and 86. The hinge of brace member 58 acts to resiliently bias leg portions 78, 80 away from each other toward a position defining a V-shaped cross section. This action brings the material of leg portions 78, 80 between the ends of the slots, such as 84, 86, into contact with the ends of slot 72. In this manner, with the material of side panel 22 received within the slots forming tabs 88, 90, the lateral position of brace member 58 relative to side panel 22 is fixed.

Similar structure is provided at the other end of brace member 58 and in slot 70 formed in side Brace member 60 is interconnected between side panels 18 and 22 in a similar manner, as are brace members 54 and 56 between side panels 16 and 20.

With the components and construction as described, fish crib 10 is adapted to be shipped in knock-down form and assembled on site. Fish crib 10 can either be assembled on shore and towed to the desired location in the body of water, or it can be assembled on location in a boat or in place under water. Alternatively, fish crib 10 can be assembled on location while the body of water is frozen and left in position, and allowed to sink when the ice melts. Either way, the assembled fish crib 10 is placed into a desired location in the body of water so that bottom panel 14 rests on the bottom of the body of water.

Prior to assembling top panel 12 onto the upper portions of side panels 16–22, it is desirable to place brush or the like, such as shown generally at 92 in FIG. 1, into the interior of the assembled bottom and side panels. The brush 92 enhances desirability of fish crib 10 as a fish habitat.

The polyethylene material from which fish crib 10 is constructed is resistant to breakdown, and remains in place in the body of water until removed. A sturdy and desirable fish habitat is thus provided. In addition, the structure is lightweight, allowing it to rest on a soft bottom which may not support a heavy crib structure. The structure facilitates administration by a governmental body, such as a State Department of Natural Resources, which can purchase the components of the fish crib and distribute them to applicants. The number of fish cribs can then be monitored, as can the particular location of the cribs.

Various alternatives and embodiments are contemplated as being within the scope of the following claims particularly pointing out and distinctly claiming the subject matter regarded as the invention.

I claim:

1. A fish crib comprising:
    a bottom panel;
    a top panel spaced above the bottom panel;
    a plurality of side panels extending between the top and bottom panels; and
    connector means for connecting the bottom panel, the top panel, and the side panels together to form a substantially closed structure into which brush or the like is adapted to be placed and which is adapted for placement on the bottom of a body of water;
    wherein one or more of the side panels are provided with one or more openings for providing access for fish into the interior of the structure; and
    wherein the material from which the bottom panel, the top panel, and the side panels are formed comprises first and second substantially planer plastic members spaced apart from each other, with plastic structure disposed therebetween defining internal spaces between said first and second members.

2. The fish crib of claim 1, wherein the bottom panel, the top panel, and the side panels are formed of a corrugated plastic material.

3. The fish crib of claim 2, further comprising internal lateral support means comprising a plurality of brace members for providing lateral stability to the structure.

4. The fish crib of claim 3, wherein the brace members extend between and interconnect the side panels.

5. A fish crib, comprising:
    a bottom panel;
    a top panel spaced above the bottom panel;
    a plurality of side panels extending between the top and bottom panels; and
    connector means for connecting said bottom panel, said top panel, and said side panels together to form a substantially closed structure into which brush or the like is adapted to be placed and which is adapted for placement on the bottom of a body of water;
    wherein the side panels are provided with a plurality of openings for providing access for fish into the interior of the structure, and wherein the top and bottom panels are free of openings which provide access for fish into the interior of the structure.

6. The fish crib of claim 5, wherein the top, bottom and side panels are provided with a series of spaced apertures toward their outer edges, and wherein said connector means is engagable with the top, bottom and side panels at the spaced apertures.

7. The fish crib of claim 6, wherein the apertures in said top, bottom and side panels are located so as to provide closely adjacent pairs of apertures adjacent the corners of the structure, and wherein the connector means comprises a plurality of individual connector members each extending through one of the pairs of apertures.

8. The fish crib of claim 5, further comprising internal lateral support means for providing lateral stability to the structure.

9. The fish crib of claim 8, wherein the internal lateral support means comprises a plurality of brace members extending between the side panels through the interior of the structure.

10. The fish crib of claim 9, wherein each said brace member includes engagement means disposed toward each of its ends engagable with a slot formed in one of said side panels for interconnecting the end of said brace member with said side panel.

11. A fish crib comprising:
    a bottom panel;
    a top panel spaced above the bottom panel;
    a plurality of side panels extending between the top and bottom panels, said side panels being provided with a plurality of openings;
    connector means for connecting said bottom panel, said top panel, and said side panels together, to form a substantially closed structure into which brush or the like is adapted to be placed and which is adapted for placement on the bottom of a body of water, with the openings in said side panels providing access for fish into the interior of the structure; and
    internal lateral support means for providing lateral stability to the structure, comprising one or more brace members extending between the side panels through the interior of the structure, wherein each brace member is engagable toward each of its ends with a slot formed in one of said side panels for interconnecting the end of said brace member with said side panel, wherein each said brace member comprises a hinged member having leg portions providing a substantially V-shaped cross section when in an assembled position within said structure, said brace member being foldable about said hinge to an assembly position in which said leg portions are moved toward each other, and wherein the slot formed in said side panel is formed so as to receive said brace member in its assembly position and to accommodate movement of the legs of said brace member to their assembled position.

12. The fish crib of claim 11, further comprising cooperating means disposed between said brace member and said side panel for maintaining the lateral position of the brace member relative to the side panel when the brace member is in its assembled position.

13. The fish crib of claim 12, wherein each leg of the brace member is provided with a slot extending inwardly from an edge of the leg and wherein the slot in the side panel is formed so as to receive the brace member in its assembly position and to accommodate movement of the brace member to its assembled position, with the slot formed in each leg of the brace member receiving the material of the side panel therein for maintaining the lateral position of the brace member relative to the side panel.

14. The fish crib of claim 11, wherein said brace member is formed of a resilient material which forms the hinge between the leg portions of the brace member when the material is longitudinally slit through less than its entire thickness.

15. The fish crib of claim 14, wherein the brace member is formed from a corrugated plastic material.

16. A method of creating a fish habitat, comprising the steps of:
providing a top panel, a bottom panel, and a plurality of side panels, said side panels being provided with openings;
assembling said top, bottom and side panels to form a substantially closed structure, with the openings in the side panels providing access to the interior of the structure;
bracing the structure formed by assembly of the top, bottom and side panels against lateral movement by providing brace members in the interior of the structure and connecting the brace members with the side panels, wherein each brace member has opposed end portions, and wherein the step of connecting the brace members with the side panels comprises forming each brace member such that its end portions are movable between an assembly position and an assembled position and biased toward its assembled position, and providing connecting structure on each said side panel for receiving an end portion of the brace member in its assembly position and accommodating movement thereof to its assembled position, wherein movement of the brace member end portion to its assembled position causes engagement thereof with the connecting structure to fix the lateral position of the brace member relative to the side panel;
placing a quantity of brush or the like into the interior of the structure; and
placing said structure into a body of water such that said bottom panel rests on the bottom of the body of water.

17. The method of claim 16, wherein the step of assembling the top, bottom and side panels comprises connecting the panels together at spaced intervals toward the edges of each panel.

18. The method of claim 17, wherein each panel is provided with spaced apertures toward its edges, with said apertures being located to provide closely adjacent pairs of apertures adjacent the corners of the structure with the panels being connected together by individual connector members each extending through one of the pairs of apertures.

* * * * *